United States Patent [19]

Ang et al.

[11] Patent Number: 5,019,406

[45] Date of Patent: May 28, 1991

[54] FIBER ADDITIVES FOR FRYING BATTERS

[75] Inventors: Jit F. Ang; William B. Miller; Irene M. Blais, all of Berlin, N.H.

[73] Assignee: James River Corporation of Virginia, Richmond, Va.

[21] Appl. No.: 379,358

[22] Filed: Jul. 13, 1989

[51] Int. Cl.$^5$ .................................................. A23B 9/14
[52] U.S. Cl. ........................................ 426/302; 426/552
[58] Field of Search ............... 426/552, 549, 94, 302, 426/305

[56] References Cited

U.S. PATENT DOCUMENTS

| | | | |
|---|---|---|---|
| 1,964,940 | 7/1934 | Epstein | 426/549 |
| 3,573,061 | 3/1971 | Glabe | 426/549 |
| 3,843,827 | 10/1974 | Lee | 426/549 |
| 3,979,523 | 9/1976 | Titcomb | 426/549 |
| 4,181,747 | 1/1980 | Kickle | 426/521 |
| 4,241,093 | 12/1980 | Farag | 426/259 |
| 4,431,681 | 2/1984 | Hegedus | 426/804 |
| 4,451,489 | 5/1984 | Beale | 426/259 |
| 4,451,490 | 5/1984 | Silverman | 426/804 |
| 4,529,607 | 7/1985 | Lenchin | 426/302 |
| 4,588,600 | 5/1986 | Suderman | 426/555 |
| 4,595,597 | 6/1986 | Lenchin | 426/555 |
| 4,668,519 | 5/1987 | Dartey | 426/804 |
| 4,735,814 | 4/1988 | Chigurupati | 426/463 |
| 4,774,098 | 9/1988 | Gould | 426/622 |
| 4,774,099 | 9/1988 | Feeney | 426/804 |
| 4,778,684 | 10/1988 | D'Amico | 426/94 |
| 4,842,874 | 6/1989 | D'Amico | 426/94 |
| 4,877,628 | 10/1989 | Stypula | 426/302 |
| 4,877,629 | 10/1989 | Stypula | 426/302 |

FOREIGN PATENT DOCUMENTS

| | | | |
|---|---|---|---|
| 63-291549 | 11/1988 | Japan | 426/552 |
| 63-304937 | 12/1988 | Japan | 426/549 |
| 64-62303 | 3/1989 | Japan | 426/549 |

*Primary Examiner*—Carolyn Paden
*Attorney, Agent, or Firm*—Sixbey, Friedman, Leedom & Ferguson

[57] ABSTRACT

A substantially farinaceous, fiber-containing batter to produce a battered and fried food having reduced lipid retention and increased moisture content after frying. The preferred fibrous additive for this purpose is powdered cellulose; however, various dietary fibers such as oat fiber, soy fiber, pea fiber, or sugar beet fiber, to name only a few, may be used to achieve the same purpose. More specifically, the fibrous additive is preferably present in the batter in an amount of about 0.3–3.0% by weight of the batter having an average fiber length of from about 50–500 microns. The addition of fiber to a batter used for frying will allow food producers to provide a healthier fried food item which will be more appealing to a health conscious consumer. Moreover, the fiber additive can also enhance the appearance of the fried food by providing a golden yellow color after frying, rather than a non-uniform brown color containing brown and black batter particles. Further, the fiber containing batter is stronger than conventional frying batters which allows the batter to more readily stay intact during and after frying.

15 Claims, No Drawings

FIBER ADDITIVES FOR FRYING BATTERS

TECHNICAL FIELD

The present invention relates to a farinaceous composition useful for preparing battered and fried foods. More specifically, this invention relates to a batter which reduces fat content and improves the physical properties and appearance of fried foods.

BACKGROUND OF THE INVENTION

The United States and other developed nations are greatly concerned with producing low caloric content food products which also have reduced saturated fat and cholesterol levels. This concern stems from medical findings that high intake of fat and cholesterol may lead to arterial and heart disease. However, an obstacle to achieving a healthier diet is the public's enjoyment of fried foods. A glance at nearly any restaurant menu will probably reveal several dishes prepared by frying. This may be a mere appetizer of battered and fried mushrooms to a main dish of fried shrimp. Moreover, the food selections offered by fast food restaurant chains are monopolized by a variety of battered and fried foods such as fried chicken, fish fillet, chicken sandwiches, and chicken nuggets to name only a few. The health conscious consumer is, therefore, torn between reducing fat intake and enjoying fried foods.

Food coatings have been developed and are currently well known in the food industry. The coating described in U.S. Pat. No. 4,588,600, issued to Suderman, illustrates a recently developed coating for simulating a fried appearance on foods after baking This coating, however, does not provide a suitable means to reduce fat retention during actual frying.

Conventional frying batters also become weak during frying and do not maintain their integrity. Specifically, a batter may experience "blow-outs" during frying due to pressure built up between the batter and the food product causing the batter to fall off of the food. A stronger coating would greatly improve the appearance of fried foods.

Development is currently advancing in the area of food ingredient additives or substitutes to produce low calorie foods in response to consumer's increased desire for healthier diets. In the past decade, powdered cellulose has gained prominence as a food ingredient. For example, U.S. Pat. No. 4,156,021 issued to Richardson discloses an oleaginous, fibrous simulated food product wherein fibrous cellulose is used to form a component of a base composition. A variety of products can be produced such as margarine, coffee creamers or dips. However, Richardson is not directed to a batter to aid in reducing fat retention during frying.

Moreover, cellulose has also been used as a flour substitute to produce a low calorie food product. U.S. Pat. No. 4,219,580, issued to Torres, discloses a flour substitute wherein plant cellulose, such as the type sold under the tradename "Solka-Floc" is used to produce such a product. However, this substitution additionally requires a gum and an emulsifier for acceptable results and is primarily limited to baked goods such as breads, cakes or crusts.

Therefore, the prior art fails to address a farinaceous composition for preparing battered and fried foods which will reduce fat content without sacrificing the moisture content of fried foods to produce a food which is visually appealing and appetizing to the consumer. Moreover, a stronger batter which will remain on the food and maintain its integrity during frying will also be beneficial to the food preparation industry.

SUMMARY OF THE INVENTION

A primary object of the present invention, therefore, is to overcome the disadvantages of the prior art and to provide a batter for fried foods which reduces lipid retention and increases moisture content after frying.

Another object of the present invention is to provide a batter for fried foods which includes a fibrous additive and reduces lipid retention and increases moisture content.

Still another object of the present invention is to provide a batter for fried foods including a fibrous additive which produces a uniform color and reduced levels of undesired brown and black batter particles after frying.

Yet another object of the present invention is to provide a method for frying foods including a fibrous additive which maintains its integrity during frying better than conventional farinaceous batters to retain batter on food and reduce lipid retention of the fried food.

Another object of the present invention is to provide a substantially farinaceous, fiber-containing batter for fried foods which reduces lipid retention and increases moisture content of the food fried in the batter wherein the preferred fiber is powdered cellulose.

The aforesaid objects are achieved by providing a substantially farinaceous, fiber-containing batter to produce a battered and fried food having reduced lipid retention and increased moisture content after frying. The preferred fibrous additive for this purpose is powdered cellulose; however, various dietary fibers such as oat fiber, soy fiber, pea fiber, or sugar beet fiber, to name only a few, may be used to achieve the same purpose. More specifically, the fibrous additive is preferably present in the batter in an amount of about 0.3–3.0% by weight of the batter having an average fiber length of from about 50–500 microns. The addition of fiber to a batter used for frying will allow food producers to provide a healthier fried food item which will be more appealing to a health conscious consumer. Moreover, the fiber additive can also enhance the appearance of the fried food by providing a golden yellow color after frying, rather than a nonuniform brown color containing brown and black batter particles. Further, the fiber containing batter is stronger than conventional frying batters which allows the batter to more readily stay intact during and after frying.

The various objects and advantages of the present invention will become more apparent from the following Detailed Description of the Preferred Embodiment.

DETAILED DESCRIPTION OF THE PREFERRED EMBODIMENT

The public has recently become very conscious of their saturated fat and cholesterol intake because of medical findings linking heart disease with a high consumption of these. One of the leading food culprits is batter fried foods. This invention allows the public to continue to enjoy battered and fried food products in a healthier form by reducing the amount of lipid or fat retention in the food after frying without diminishing the taste and further improving the appearance of the fried food product. More specifically, the invention includes adding a fibrous material, preferably powdered cellulose, to a substantially farinaceous batter composition. The presence of the fibrous material causes the batter to retain less fat and increases the moisture retention of the food product during frying. Moreover, studies have demonstrated that the lipid retention of the entire food product may be decreased and moisture content increased for foods coated with a batter containing fiber. These capabilities will make foods prepared according to the present invention more appealing to health conscious consumers. Moreover, the present invention represents a significant improvement over available conventional frying batters which do not reduce lipid retention.

The batter of the present invention is preferably formed from a substantially farinaceous, dry mixture of flour and conventional batter additives. However, other flours, such as rice, oat, or corn could also be used. The preferred composition of this invention includes a coarse grained powdered cellulose having an average particle length of from about 50 to 500 microns. The coarse grained powdered cellulose is present in the mixture at about 0.3% to about 3.0% based on the total weight of the batter mixture. The cellulose is present in an amount of 1 to 8% by weight of a dry batter mixture. Preferably, the powdered cellulose should be present in the batter in an amount of from about 0.5 to 1.5% by weight having an average fiber length of from about 100 to 300 microns. Further, the powdered cellulose for this invention also should have a porous matrix that is not totally collapsed. Therefore, each fiber has an internal void volume. At levels greater than 2%, the viscosity of the batter increases significantly and handling becomes difficult. Therefore, powdered cellulose used at this level may not be suitable for commercial applications where pumps are employed.

Powdered cellulose, which is a natural polymer of beta—1, 4—glucan, has been used as a food ingredient for many years. Since it is an indigestible fiber with an average total dietary fiber content of not less than 99% (dry weight basis) and is considered to be non-caloric, powdered cellulose has gained prominence as a food ingredient. Therefore, adding cellulose fibers to a batter will reduce the calorie content of the batter of the fried food product.

By using powdered cellulose in batter mixes as described above, one can also produce a fried food product having a more uniform color than products battered and fried from compositions that do not contain the powdered cellulose. In addition, the color of products with this cellulose is lighter (golden yellow) compared to those without cellulose (golden brown). This difference in color is due to the non-browning property of powdered cellulose. Unlike other carbohydrates, powdered cellulose does not undergo any nonenzymic browning reaction, including Maillard reaction and caramelization. As a result, the level of melanoidins (brown to black amorphous nondescript polymers) in products containing cellulose is lower.

Further, the physical characteristics of the battered and fried product are also improved. Specifically, the batter coating can maintain its integrity, and fewer "blow-outs" occur during the frying of products incorporating the present composition. During frying, conventional batters cannot always withstand pressure build-up between the batter and the food product resulting in blow-outs. Batter containing fiber particles is stronger and, therefore, provides a more continuous batter coating.

The batter to which the powdered cellulose is to be added may be a conventional commercial batter containing flour, spices, and leavening agents or one of a variety of homemade batters containing the kinds of ingredients listed in detail in the examples to follow. By comparing the amount of lipids and moisture retained in a sample batter that does not include cellulose with samples that do, the superior characteristics of these batters containing the cellulose may be demonstrated.

In addition to powdered cellulose, a number of other fibrous materials can also be used for this invention. These include dietary fibers such as oat fiber, pea fiber, soy fiber, and sugar beet fiber. Mixtures of two or more of these fibers could also be employed as a frying batter additive. However, the flavor and color produced by these fibers vary. Therefore, food fried with some of the fibers may be more appealing than others to the consumer.

The present invention is illustrated by the following examples, which are intended to be purely exemplary of the invention and are not intended to be limiting.

EXAMPLE 1

Three samples using a commercially available, premixed batter mix (Don's Chuckwagon Kitchens All Michigan) which contained a major portion of unbleached wheat flour and minor portions of salt, dried whey, spices, bicarbonate of soda, monocalcium phosphate monohydrate, and buttermilk powder were used as the basis for the tests conducted in this Example.

5.1 g of coarse grained cellulose having an average fiber length of about 110 microns was dry blended with the first sample prior to the addition of the wet ingredients and labeled Sample A. Similarly, 5.1 g of coarse grained cellulose having an average fiber length of about 290 microns was dry blended with the second sample prior to the addition of the wet ingredients and labeled Sample B. The third sample, to which no cellulose was added, served as the control. A suitable cellulose fiber commercially available for this invention is that designated UF-900FC and UF-1000 FC, which is available from James River Corporation. The following ingredients were blended to form the batters:

|  | Control (g) | Sample A(g) | Sample B(g) |
| --- | --- | --- | --- |
| Dry Batter Mix | 170 | 170 | 170 |
| Powdered Cellulose | 0 | 5.1 | 5.1 |
| Water | 200 | 200 | 200 |

The batters were mixed using a hand-held wire whisk until smooth. They were then allowed to hydrate for about five minutes. Mushrooms were dipped into the batters and fried separately at about 180° C. for three minutes. Both liquid oil as well as solid shortening were used as frying mediums during separate occasions to compare differing lipid concentrations in each. The fried products were placed on top of paper towels after cooking.

After cooling, the layer of batter coating was removed and analyzed for lipid content. The removed batter was first ground in a Waring Blendor. An appropriate portion was then loaded into a pure cellulose extraction thimble. This sample was in turn placed into a Soxhlet extraction setup. Lipid was extracted from the batter sample by refluxing dichloromethane through the sample. At the end of five hours, the dichloromethane was evaporated off on a hot plate leaving behind the extracted lipid. The contents of the flask were dried overnight in an oven at 105° C. before they were weighed and the lipid content calculated. The moisture content of ground batter samples was also determined using the standard oven drying method at 105° C. The results of the above analysis are tabulated below in Tables 1 and 2. (Parentheses, used in all of the following tables, represent the percent change from the control sample.)

TABLE 1

| Samples Fried in Solid Shortening | | |
|---|---|---|
| Sample | % Lipid | % Moisture |
| Control | 28.3 | 26.6 |
| Sample A | 22.4 (−20.8) | 35.0 (+31.6) |
| Sample B | 19.5 (−31.1) | 36.7 (+38.0) |

TABLE 2

| Samples Fried in Liquid Oil | | |
|---|---|---|
| Sample | % Lipid | % Moisture |
| Control | 33.5 | 28.0 |
| Sample A | 25.1 (−25.1) | 34.7 (+23.9) |
| Sample B | 25.2 (−24.8) | 34.7 (+23.9) |

The color of battered products containing cellulose was lighter than those which did not contain cellulose. The eating characteristics of Samples A and B were as good as or better than their respective controls. In addition, all fried products that contained cellulose in their batter appeared to be juicer and more appealing. It is evident from the results shown in Tables 1 and 2 that the addition of powdered cellulose significantly decreased the lipid contents of the batter coatings while increasing their moisture contents.

In addition, commercially available Golden Dipt English Style Fish and Chips Batter Mix and Golden Dipt Japanese Style Tempura Batter Mix, both produced by Golden Dipt of St. Louis, MO, were also used for coating skinless white fish fillets and mushrooms, respectively, wherein cellulose fiber was added to one of two mixes for each batter mix and labeled Sample A. The results, presented in Tables 3 and 4, of quantitative lipid and moisture concentration, carried out as described above, again show those mixes containing cellulose having lower lipid concentration and higher moisture present than in those without.

TABLE 3

| Skinless, White Fish Fillets Fried in Solid Shortening Golden Dipt English Style Fish & Chips Batter Mix | | |
|---|---|---|
| Sample | % Lipid | % Moisture |
| Control | 17.7 | 45.0 |
| Sample A | 12.8 (−27.7) | 47.0 (+4.4) |

TABLE 4

| Mushrooms Fried in Solid Shortening Golden Dipt Japanese Style Tempura Batter Mix | | |
|---|---|---|
| Sample | % Lipid | % Moisture |
| Control | 45.8 | 22.8 |
| Sample A | 37.9 (−17.2) | 29.4 (+28.9) |

EXAMPLE 2

Three sample mixes for each food item were prepared as in Example 1 using the same commercially available batter mixes. Lean chicken strips and skinless white fish fillets were dipped into the batters and fried separately at about 180° C. for three minutes. Lipid and moisture analyses were carried out as described in Example 1.

Results are presented in Tables 5 and 6 for the chicken strips and Tables 7 and 8 for the fish fillets. The batters containing cellulose again contained lower levels of lipid and higher levels of moisture than batters that did not contain cellulose.

TABLE 5

| Chicken Strips Fried in Solid Shortening | | |
|---|---|---|
| Sample | % Lipid | % Moisture |
| Control | 19.4 | 34.7 |
| Sample A | 19.1 (−1.5) | 38.4 (+1.9) |
| Sample B | 16.5 (−14.9) | 40.9 (+8.5) |

TABLE 6

| Chicken Strips Fried in Liquid Oil | | |
|---|---|---|
| Sample | % Lipid | % Moisture |
| Control | 25.3 | 31.6 |
| Sample A | 14.6 (−42.3) | 43.1 (+36.4) |
| Sample B | 17.5 (−30.8) | 38.5 (+21.8) |

TABLE 7

| Fish Fillets Fried in Solid Shortening | | |
|---|---|---|
| Sample | % Lipid | % Moisture |
| Control | 22.6 | 34.9 |
| Sample A | 14.3 (−36.7) | 42.6 (+22.1) |
| Sample B | 16.0 (−29.2) | 41.9 (+20.1) |

TABLE 8

| Fish Fillets Fried in Liquid Oil | | |
|---|---|---|
| Sample | % Lipid | % Moisture |
| Control | 17.1 | 39.4 |
| Sample A | 12.4 (−27.5) | 45.6 (+15.7) |
| Sample B | 11.2 (−34.5) | 45.7 (+16.0) |

EXAMPLE 4

Three home made dry batter mixes were prepared using the following ingredients:

| Wheat Flour | 82.35% |
|---|---|
| Corn Starch | 10.46% |
| Salt | 2.90% |
| Sugar | 2.32% |
| Baking Powder | 0.99% |
| Black Ground Pepper | 0.49% |
| Paprika Powder | 0.49% |

Mix 1 was used as the control. Each batch of batter tested containing 138 g of the above dry mix. To the other two mixes, 4.14 g (3% by weight of the dry composition), of coarse grained powdered cellulose having an average fiber length of 110 and 290 microns were added to each and were labeled Sample A and Sample B, respectively. The powdered cellulose was blended together with the dry mix prior to the addition of the wet ingredients. The mixes were then blended with the following wet ingredients to form batters:

| Milk | 80.92% |
|---|---|
| Whole Eggs | 19.08% |

Each batter of dry mix was blended with 262 g of the above wet ingredients to form the complete batter. The batter was mixed using a hand-held wire whisk until smooth. It was then allowed to hydrate for about five minutes. Mushrooms were dipped into the batter and fried at about 180° C. for three minutes. Both liquid oil as well as solid shortening were used as frying media during separate occasions. The fried products were placed on top of paper towels after cooking. After cooling, the layer of batter coating was removed and analyzed for its lipid and moisture content as in Example 1.

The color of products fried with this home-made batter was again lighter in those which contained cellulose in their batters. Tables 9 and 10 show the lipid and moisture contents of these batter coatings. Again, the levels of lipid in batters that contained powdered cellulose were lower than those which did not contain powdered cellulose. Furthermore, the moisture levels were also higher in samples containing cellulose.

TABLE 9

| | Solid shortening | |
|---|---|---|
| Sample | % Lipid | % Moisture |
| Control | 42.8 | 27.6 |
| Sample A | 33.2 (−22.4) | 33.0 (+19.6) |
| Sample B | 33.0 (−22.9) | 32.9 (+19.2) |

TABLE 10

| Sample | % Lipid | % Moisture |
|---|---|---|
| Control | 30.2 | 39.0 |
| Sample A | 25.9 (−14.2) | 42.5 (+9.0) |
| Sample B | 25.4 (−15.9) | 42.7 (+8.7) |

EXAMPLE 5

Batter mixes for each food item were prepared as in Example 4. Lean chicken strips, skinless white fish fillets, onion rings and prepared chicken legs (skin-on) were dipped into the batters and fried separately at about 180° C. for three minutes. Quantitative lipid and moisture analyses were carried out as described in Example 1.

From the results presented in Tables 11 through 16, it is evident that the addition of powdered cellulose to the batter mix resulted in less fat and/or oil retention during frying.

TABLE 11

| Lean Chicken Strips Fried in Solid Shortening | | |
|---|---|---|
| Sample | % Lipid | % Moisture |
| Control | 36.2 | 25.8 |
| Sample A | 23.7 (−34.5) | 38.0 (+47.3) |
| Sample B | 24.6 (−32.0) | 41.7 (+61.6) |

Table 12

| Lean Chicken Strips Fried in Liquid Oil | | |
|---|---|---|
| Sample | % Lipid | % Moisture |
| Control | 18.3 | 43.9 |
| Sample A | 13.2 (−27.9) | 47.3 (+7.7) |
| Sample B | 17.1 (−6.6) | 44.5 (+1.4) |

TABLE 13

| White Fish Fillets Fried in Solid Shortening | | |
|---|---|---|
| Sample | % Lipid | % Moisture |
| Control | 51.5 | 17.3 |
| Sample A | 41.0 (−20.4) | 28.1 (+62.4) |
| Sample B | 38.6 (−25.0) | 34.6 (+100.0) |

TABLE 14

| White Fish Fillets Fried in Liquid Oil | | |
|---|---|---|
| Sample | % Lipid | % Moisture |
| Control | 29.1 | 30.8 |
| Sample A | 25.6 (−12.0) | 33.6 (+9.1) |
| Sample B | 22.2 (−23.7) | 32.5 (+5.5) |

TABLE 15

| Chicken Legs Fried in Solid Shortening | | |
|---|---|---|
| Sample | % Lipid | % Moisture |
| Control | 50.3 | 22.4 |
| Sample A | 41.2 (−18.1) | 30.5 (+36.2) |
| Sample B | 40.6 (−19.3) | 34.1 (+52.2) |

TABLE 16

| Onion Rings Fried in Solid Shortening | | |
|---|---|---|
| Sample | % Lipid | % Moisture |
| Control | 66.8 | 5.4 |
| Sample A | 53.2 (−20.4) | 17.5 (+224.1) |
| Sample B | 53.9 (−19.3) | 15.2 (+181.5) |

EXAMPLE 6

Two dry hushpuppy mixes were prepared containing the following ingredients:

| Self-rising corn meal flour | 70% |
|---|---|
| Self-rising bleached wheat flour | 30% |

The first mix served as the control and no cellulose fiber was added prior to the addition of water. To Sample A, 0.7% (based on weight of wet mix) coarse grained cellulose fiber having an average fiber length of 110 microns was dry blended into the mix prior to the addition of water. The dry batter mixes were prepared as follows:

| | Control | Sample A |
|---|---|---|
| Dry Batter Mix | 200 g | 200 g |
| Cellulose fiber | — | 2.45 g |
| Water | 150 g | 150 g |

The batters were mixed using a hand-held rubber spatula until smooth They were then allowed to hydrate for about five minutes. The batters were individually shaped into balls having a diameter of approximately 1.5 inches, resembling commercial hush puppies. These were then fried in solid shortening at about 180° C. for 1.5 minutes. The cooked products were allowed to cool on dry paper towels.

The lipid contents of these hush puppies were determined according to the methodology published in the *Official Methods of Analysis of The Association of Analytical Chemists,* Fourteenth Edition. The title of this methodology is "Fat in Foods - Chloroform-Methanol Extraction Method" and it is printed on page 882 (Method 43 275–43.277) of the above publication.

Quantitative results of the fat and moisture analysis are shown in Table 17. As the results indicate, the level of fat in the hush puppies containing cellulose is lower than in the hush puppies without cellulose. In addition, the moisture contents were higher in those products which contained cellulose puppies with cellulose fiber was also lighter than in the control hush puppies. However, no difference in eating qualities were detected.

TABLE 17

| Hushpuppies Fried in Solid Shortening | | |
|---|---|---|
| Sample | % Lipid | % Moisture |
| Control | 3.9 | 33.4 |
| Sample A | 2.2 (−43.6) | 42.7 (+27.8) |

EXAMPLE 7

Six home made dry batter mixes were prepared as in Example 4. Each batch of batter tested contained 138 g of the above dry mix described in Example 4. Mix 1 was used as the control To the other five mixes, 4.14 g (3% by weight of the dry mix or 1% by weight of wet batter) of the following fibers were added prior to the addition of the wet ingredients:

| Mix 1: | No fiber addition, Control. |
|---|---|
| Mix 2: | Powdered Cellulose (Having Average Fiber length of 110 Microns) |
| Mix 3: | Soy Fiber (Fi-Pro F-200, Grain Processing Corp.) |
| Mix 4: | White Oat Fiber (Better Basics TM 780, Williamson Fiber Products, Inc.) |
| Mix 5 | Pea Fiber (Centara II, Woodstone Foods Ltd.) |
| Mix 6: | Tan Oat Fiber (Better Basics TM 770, Williamson Fiber Products, Inc.) |

The fibers were pre-blended together with the dry mix prior to the addition of the wet ingredients. The mixes were then blended with the following wet ingredients to form batters:

| Milk | 80.92% |
|---|---|
| Whole Eggs | 19.08% |

Each batch of dry mix was blended with 262 g of the above wet ingredients to form the complete batter. The batter was mixed using a hand-held wire whisk until smooth. It was then allowed to hydrate for about five minutes. Medium sized button mushrooms were dipped into the batter and fried in solid shortening at about 180° C. for three minutes. Quantitative lipid and moisture analyses were carried out as outlined in Example 1.

Table 18 shows the lipid and moisture contents of these batter coatings. The level of fat in the batter coating that contained powdered cellulose was the lowest among these six batter coatings. However, as can be noted in Table 18, the addition of other fibers such as soy fiber, white oat fiber, and tan oat fiber can also lowered the fat content of the fried batter coating.

TABLE 18

| Mushrooms Fried in Solid Shortening | | |
|---|---|---|
| Sample | % Lipid | % Moisture |
| Control | 39.6 | 29.4 |
| Sample A | 28.8 (−27.3) | 36.4 (+23.8) |
| Soy Fiber | 36.3 (−7.6) | 30.9 (+5.1) |
| White Oat Fiber | 36.1 (−8.8) | 31.7 (+7.8) |
| Pea Fiber | 43.5 (+9.8) | 26.9 (−8.5) |
| Tan Oat Fiber | 34.7 (−12.4) | 29.9 (+1.7) |

EXAMPLE 8

Two dry home made batters mixes were prepared as in Example 4. Mix 1 was used as the control. To the second mix, 4.14 g (3% by weight of the dry composition) of coarse grained powdered cellulose was added and pre-blended prior to the addition of wet ingredients as outlined in Example 4. Medium sized button mushrooms as well as chicken strips and skinless, white fish fillets were dipped into the batters and fried separately in solid shortening at about 180° C. for three minutes. The fried products were placed on top of paper towels after cooking. After cooling, the whole, fried, battered products (batter coating not separated) were placed into a blender and ground up. Quantitative lipid and moisture analyses were carried out on the ground food product and batter coating as in Example 1.

The results of the above example are shown in Tables 19-21. They indicate that the fat and/or oil content in the entire fried food product is lower for those foods whose batter contained cellulose than those which did not contain cellulose. This example further demonstrates the potential advantages of a batter prepared in accordance with the present invention over conventional batter mixes.

TABLE 19

| Battered Mushrooms Fried in Solid Shortening | | |
|---|---|---|
| Sample | Lipid | % Moisture |
| Control | 12.2 | 64.5 |
| Sample A | 8.2 (−32.8) | 66.6 (+3.3) |

Table 20

| Battered Chicken Strips Fried in Solid Shortening | | |
|---|---|---|
| Sample | % Lipid | % Moisture |
| Control | 11.1 | 58.5 |
| Sample A | 8.3 (−25.2) | 59.4 (+1.5) |

TABLE 21

| Battered Fish Fillets Fried in Solid Shortening | | |
|---|---|---|
| Sample | % Lipid | % Moisture |
| Control | 11.0 | 60.5 |
| Sample A | 6.2 (−43.6) | 63.0 (+4.1) |

INDUSTRIAL APPLICABILITY

A batter made in accordance with the present invention will have particular utility in the commercial food preparation industry. Moreover, restaurants, particularly fast food chains, will also benefit from use of such a batter by allowing them to provide a fried food product with reduced levels of lipid retention, increased food moisture content, and improved fried appearance as a result of color and stronger batter compositions. Such a product will allow consumers continued enjoyment of fried foods having a lower health risk than fried foods using conventional batter compositions.

We claim:

1. A batter for coating and forming fried food products which reduces lipid retention and increases moisture content in the food product after frying including 0.3 to 3.0% by weight of an edible substantially insoluble cellulose fiber additive having an average fiber length of 50 to 500 microns.

2. A batter for fried food products as set forth in claim 1 wherein said average fiber length is 100 to 300 microns and said cellulose fiber is present in said batter in an amount of 0.5 to 1.5% by weight.

3. A batter for fried food products as set forth in claim 2 wherein said average fiber length is 110 microns and said cellulose fiber is present in said batter in an amount of 0.7% by weight.

4. A batter for fried food products as set forth in claim 7 wherein said average fiber length is 290 microns and said cellulose fiber is present in said batter in an amount of 1.35% by weight.

5. A batter for fried food products as set forth in claim 1 further including major quantities of wheat flour and corn starch and minor quantities of spices and baking powder.

6. A method for preparing batter coated fried food products which reduces the amount of lipid retention and increases food product moisture content after frying comprising the steps of
    (a) preparing a dry batter by admixing ingredients selected from the group consisting of flour, corn starch and seasonings with a substantially insoluble dietary fiber having an average fiber length of 100 to 300 microns and being present in said dry batter in an amount of 0.5 to 1.5% by weight of said dry batter;
    (b) adding liquid to said dry batter in an amount sufficient to form a frying batter of the desired consistency;
    (c) coating a food product with the frying batter formed in step (b); and
    (d) frying said coated food product.

7. A method for preparing fried food products as set forth in claim 6 wherein said dietary fiber comprises at least one dietary fiber selected from the group consisting of cellulose fiber, soy fiber, white oat fiber, tan oat fiber, and pea fiber.

8. A method for preparing fried food products as set forth in claim 7 wherein said dietary fiber comprises cellulose fiber.

9. A batter for coating a food product to be fried wherein said batter reduces lipid retention and increases moisture content in the food product after frying and said batter includes 0.3 to 3.0% by weight of substantially insoluble dietary fiber having an average fiber length of 50 to 500 microns.

10. A batter for forming a food product to be cooked by frying, said batter including 0.3 to 3.0% by weight of an additive comprising a substantially insoluble dietary fiber having an average fiber length of 50 to 500 microns, wherein the fried food product is characterized by reduced lipid retention and increased moisture content after frying.

11. A batter for fried food products as set forth in claim 9 or 10 wherein said dietary fiber has an average fiber length of 100 to 300 microns and is present in the batter in an amount in the range of 0.5 to 1.5% by weight.

12. A batter for fried food products as set forth in claim 9 or 10 wherein said fibrous material comprises at least one dietary fiber selected from the group consisting of cellulose fiber, soy fiber, white oat fiber, tan oat fiber, and pea fiber.

13. A batter for fried food products as set forth in claim 12 wherein said fibrous material comprises cellulose fiber.

14. An additive for a batter useful for coating and forming food products to be fried which reduces lipid retention and increases moisture content of the food after frying, wherein said additive comprises cellulose fiber and said cellulose fiber comprises from 0.5 to 1.5% by weight of the batter and has an average fiber length of 100 to 300 microns.

15. A method for preparing doughy fried food products which reduces the amount of lipid retention and increases food product moisture content after frying comprising the steps of
    (a) preparing a dry batter by admixing ingredients selected from the group consisting of flours and seasonings with a substantially insoluble dietary fiber having an average fiber length of 100 to 300 microns and being present in said dry batter in an amount of 0.5 to 1.5% by weight of said dry batter;
    (b) adding liquid to said dry batter in an amount sufficient to form a dough of the desired consistency;
    (c) forming a doughy food product having the desired shape with the dough formed in step (b); and
    (d) frying said doughy food product.

* * * * *